MAGNETIC CORE CIRCUITS

Filed Dec. 13, 1956

2 Sheets-Sheet 1

INVENTOR
H. H. ABBOTT
BY Kenneth B Hamlin
ATTORNEY

Aug. 26, 1958 H. H. ABBOTT 2,849,539

MAGNETIC CORE CIRCUITS

Filed Dec. 13, 1956 2 Sheets-Sheet 2

INVENTOR
H. H. ABBOTT
BY Kenneth B Hamlin
ATTORNEY

United States Patent Office 2,849,539

Patented Aug. 26, 1958

2,849,539

MAGNETIC CORE CIRCUITS

Henry H. Abbott, Yonkers, N. Y., assignor to Bell Telephone Laboratories, Incorporated, New York, N. Y., a corporation of New York Application December 13, 1956, Serial No. 628,169

33 Claims. (Cl. 179—90)

Figures 1, 3A, 3B:
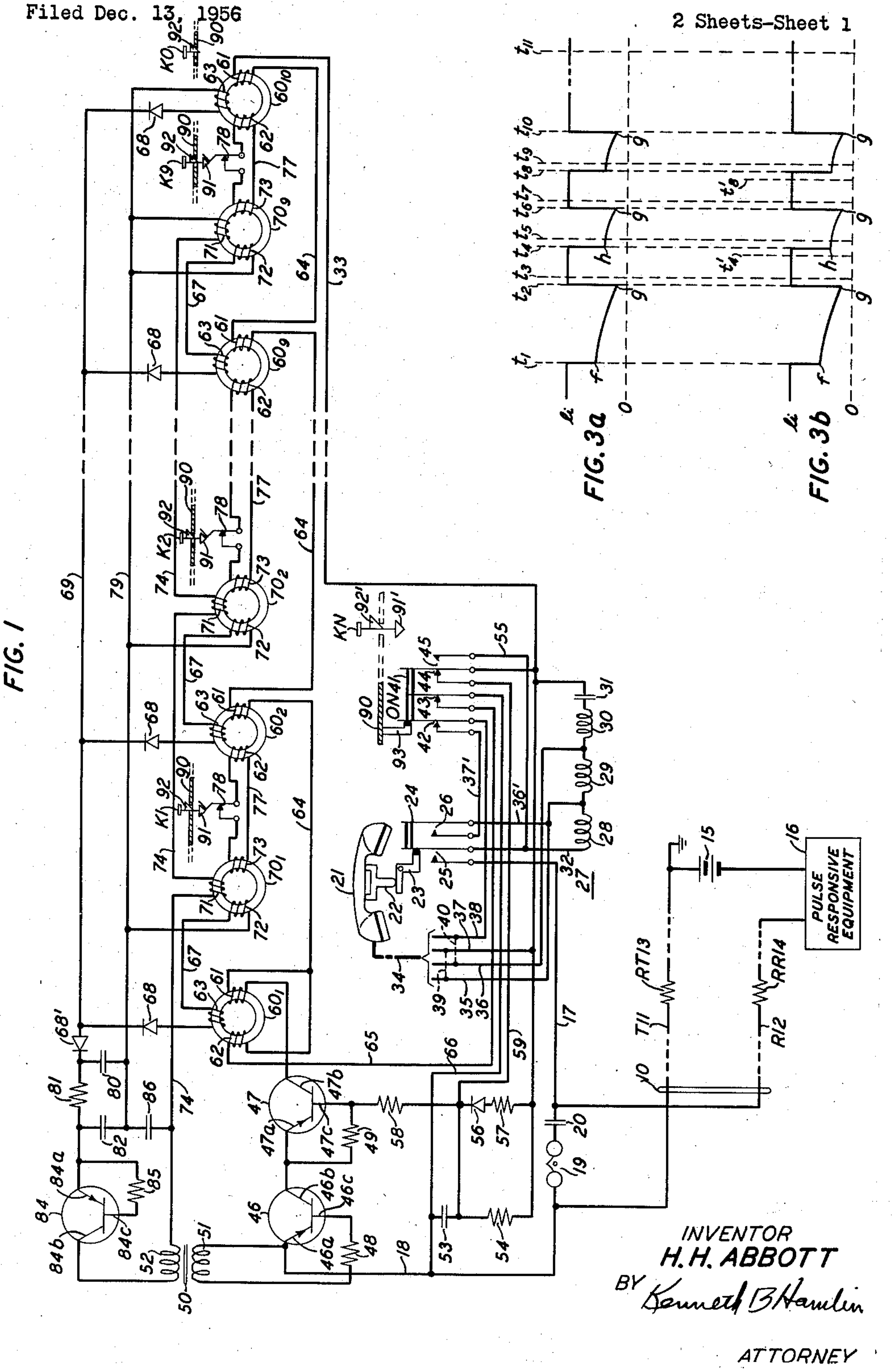

This invention relates to magnetic core circuits and more particularly to signal generators employing magnetic cores and adapted for use in telephone subscriber subsets. A signal generator adapted for use in a telephone subset is controlled by the subscriber to transmit series of electrical pulses representative of the directory designation of the distant subscriber substation with which a connection is desired.

Electrical pulses are presently generated under the control of a calling subscriber in a well-known manner by periodically interrupting a closed direct-current circuit by means of impulsing springs located in the telephone subset. The springs are controlled by the familiar finger-controlled telephone dial which is operated in accordance with the digital information of the called line to produce a series of direct-current pulses corresponding to the particular digit dialed. The current pulses operate directly, or after intermediate registration and translation, to control automatic switches which ultimately establish the desired connection between the calling and the called lines. The frequency of the current pulses is generally in the order of 10 pulses per second and this rate has been found satisfactory to control most of the relatively slow moving mechanical switching means encountered in present automatic telephone systems.

In the conventional telephone subset pulse generator, the pulses are generated mechanically and the impulsing means is inherently subject to wear, maladjustment, and the like. Because the pulses are generated by the physical movement of contacting springs a definite limit is also established upon the rate at which these pulses may be generated. This is true even when, instead of the conventional dial control, a key or push-button control of the pulse generator is provided. Although in the latter case the push-buttons may be operated as rapidly as human reflexes allow, sufficient time must still be provided to permit the relatively slow-moving mechanical means to periodically interrupt a pulsing circuit. These factors present important limiting considerations when it becomes necessary to substantially increase the pulse rate frequency and for these and other reasons present pulse generating means would be poorly adapted to some automatic telephone systems.

Because of the above-described limitations, present pulse generating means do not permit the realization of the fullest capabilities of automatic telephone systems wherein switching operations are electronically controlled. Such a telephone system is described, for example, by H. E. Vaughan and W. A. Malthaner in the Bell System Technical Journal, vol. 31, of May 1952, at page 443. Although a pulse generator to be described hereinafter according to the principles of the present invention is not directly interchangeable with the pulse generating means there described, the system of the cited article will serve to illustrate the disadvantages of the well-known dial pulsing means in conjunction with use in such a system. Further, the system referred to also illustrates the general character of electronic telephone systems with which the use of the present invention is contemplated.

One consideration necessitating a substantial increase in the control pulse rate frequency presented in the article referred to above is the necessity for decreasing the holding time of the system's switching circuits. The shorter such a holding time, the greater will be the number of calls that a switching circuit can complete during a given period and the fewer the common switching circuits required to handle the expected traffic. A pulse rate frequency considered to be optimum for, but not limiting of, the present invention is considered to be in the order of 200 pulses per second. In the provision of a suitable pulse generator controlled by a telephone subscriber adaptable for use in an electronic telephone system as described, special factors such as the requirements of both the subscriber's substation and the central office are involved. Thus in the article above cited a proposed subscriber subset including a pulse generating arrangement is described which requires a minimum amount of equipment at the central office for accepting the pulses generated. However, in that case the substation equipment would of necessity be relatively complicated and expensive and might prove economically unfeasible. Further, it is advantageous from an operating point of view that the equipment at the subscriber substation be maintained at a minimum. In this connection, for example, it is highly desirable to free the subscriber substation of the necessity for providing an external source of potential to power the subscriber control functions. Such an external source of potential would require either an additional conductor to the central office or a substation battery.

Accordingly, it is an object of this invention to generate series of electrical pulses representative of called substation information in an automatic telephone system at a substantially higher rate than is presently realized without sacrifice of apparatus simplicity and economy.

Another object of this invention is to generate high speed coded signals representative of called subscriber substation information in an automatic telephone system under the control of a calling subscriber, the signals being of a character requiring a minimum of central office equipment for their reception.

Still another object of this invention is to generate high speed coded signals representative of called subscriber substation information in an automatic telephone system under the control of a calling subscriber without the necessity of supplying an external source of potential at the subscriber substation.

A still further object of this invention is to generate high speed coded signals representative of called subscriber substation information under a minimal control of the calling subscriber.

The foregoing and other objects of this invention are realized generally in the combination of a transistor switching device for periodically opening and closing the subscriber line loop circuit and a magnetic core shift register for counting the number of times the line circuit is thus interrupted. Each time that the transistor switch permits line loop current to flow a particular condition of remanent magnetization is shifted one stage in the register. The shift of the magnetization is continued progressively along the shift register until the register is prevented from shifting further, at which time the required number of line circuit interruptions will have produced a corresponding number of direct-current pulses.

More particularly, the line circuit interrupting means, that is, the pulse generator per se, comprises a pair of transistor voltage responsive circuits connected in cascade in one side of the line loop circuit. The transistor voltage responsive arrangement such as that utilized in this invention is disclosed and claimed in the copending application of B. J. Bjornson and E. Bruce, Serial No. 334,552, filed February 2, 1953, and is also utilized to perform a substantially similar function in the circuit disclosed in Patent No. 2,818,558, issued December 31, 1957. Also included in the line circuit is the advance winding of a magnetic core, the magnetic condition of which is switched when the transistor switch permits line current to flow. The current induced in an output winding of the core by its switching is then effective to energize a second transistor switching device to cut-off the first, thereby interrupting the line loop current which marks the beginning of the break interval of the direct-current pulse being generated. The first transistor means again closes the line loop circuit responsive to a predetermined charge on a capacitor which is permitted to charge from the central office battery each time the line circuit is opened.

According to one aspect of this invention therefore, a feature thereof comprises a transistor pulse generator energized responsive to a predetermined charge on an associated capacitor to close a telephone subscriber line loop circuit and deenergized responsive to the switching of a magnetic core to open the line loop circuit, the magnetic core being switched by the flow of line current in the closed line loop circuit.

The magnetic core referred to is the first core of a two-core per bit shift register of the basic character described by Wang and Woo in the "Journal of Applied Physics," volume 21, of January 1950, at page 49. Although basically similar to the shift register there described, the shift register of the present invention incorporates novel and improved features over the register cited. The shift register here utilized operates in a conventional two-phase mode, the advance windings of corresponding cores of the register stages being serially connected to form two separate advance circuits. In the first operative phase of the register, current supplied by the central office battery is applied by the first transistor switching means to one of the advance circuits to accomplish the conventional switching function. As has already been seen, this causes the core controlling the pulse generator section of this invention to switch its magnetic condition and may be either the first core of the first stage of the register or any subsequent first core of subsequent stages, depending upon the particular pulse of the pulse series being generated.

The core thus switched was seen to control, through a second transistor switching means, the cutting off of the first transistor switch and thereby, to open the line loop circuit. The switching of a first core of a stage is also effective to transfer, via a coupling loop circuit, the particular condition of remanent magnetization to the other core of the stage. To accomplish the two functions described, the coupling loop circuit connecting a first core of a stage with a second core of a stage in the present shift register is also connected to a storage means where the induced shift current is delayed before being applied to cut-off the first transistor means and thereby the line current. The shift current finally accomplishes still another function. By means of appropriate circuit connections the latter current is also applied to the second advance circuit to shift the particular magnetic condition to the first core of the succeeding stage. At this point a cycle of operation of the register has been completed, and with another application of line current by the first transistor switch to the first advance circuit, line current again begins to flow which marks the beginning of the make interval of the direct-current pulse being generated.

Thus another feature of this invention is a novel magnetic core shift register of the two-core per bit type in which normal telephone line loop current constitutes the advance current for one phase of its operation.

Still another feature of this invention is a novel magnetic core shift register of the two-core per bit type in which, after the first phase advance current has been applied, the shift current in the coupling loops between cores of the same stage constitutes the advance current for a second phase of its operation.

The progressive shifts of the particular magnetic condition along the register with resultant interruptions in the line loop current will continue until the end of the register is reached or until the shift register circuit itself is interrupted. The former is the case when the maximum number of direct-current pulses are to be generated and transmitted, in the usual case this being ten. In order to select any series of digital pulses, each of the coupling loops connecting the successive stages of the register has associated therewith a digital key which may be operated to open the associated coupling loop circuit at that point. When the progressive shifting of the register has reached the point of the operated key, that is, at an open coupling loop circuit, the desired number of direct-current pulses will have been generated and transmitted to the central office pulse responsive equipment.

Still another feature of this invention is, therefore, a two-core per bit shift register in which a particular condition of remanent magnetization is progressively shifted between the stages of the register via coupling loops, the progressive shift being interrupted when an open coupling loop is encountered. The coupling loops connecting the cores of adjacent stages are controlled by digital keys which are operable in accordance with called telephone subscriber directory designations to interrupt the shifting of the register at points corresponding to the designations.

In another illustrative embodiment of this invention a third transistor switching means is inserted between the first and the second switching means in a manner such that the induced shift current is operative, in addition to cutting off the line loop current from the first advance circuit, to apply it to the second advance circuit. Thus in this second embodiment, the central office battery is alternately connected to the advance circuits under the control of the induced shift current to accomplish the progressive shift of the particular condition of remanent magnetization along the shift register.

A still further feature of this invention then is a novel magnetic core shift register of the two-core per bit type in which normal telephone line loop current constitutes the advance current for both phases of its operation and the shift current induced in the coupling loop circuits connecting successive stages of the register controls the switching of the line loop current between the advance circuits.

Figure 2:
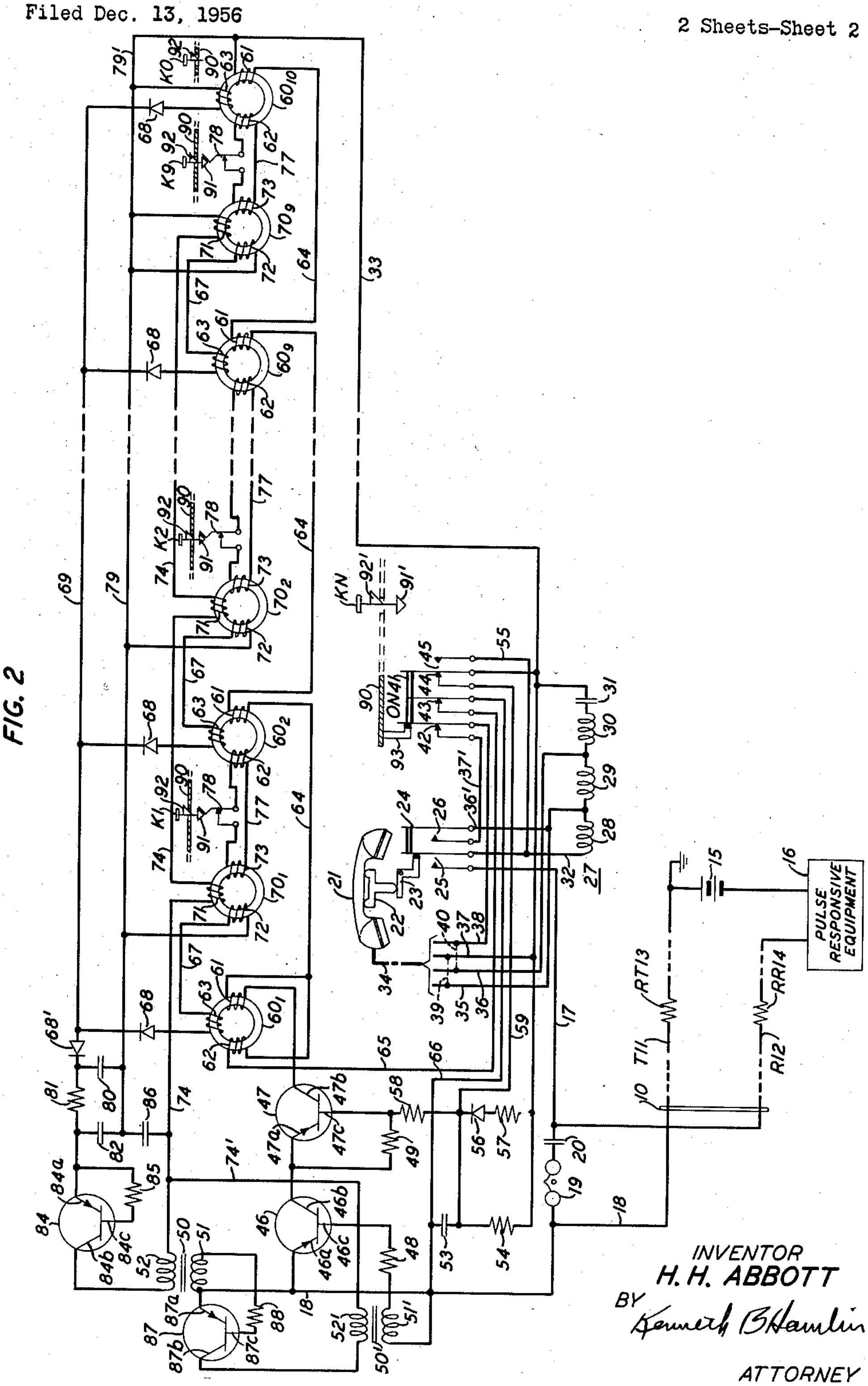

A more complete understanding of this invention together with its objects and features may be gained from a consideration of the detailed description thereof when taken in conjunction with the accompanying drawing, in which:

Fig. 1 is a schematic representation of one illustrative embodiment of this invention applied to a conventional telephone subscriber subset;

Fig. 2 is a schematic representation of another illustrative embodiment of this invention also applied to a conventional telephone subscriber subset; and Figs. 3*a* and 3*b* are a graphic comparison of the interruptions of a telephone line circuit produced by the operation of the two illustrative embodiments of the present invention described herein. Also indicated in these figures is a comparison of the circuit operations at various points therein during the transmission of the control pulses for the two illustrative embodiments. The latter comparison is made without regard to specific values and is only made to show the sequence of operations of the circuit elements in question.

The illustrative embodiments according to the principles of the present invention are contemplated to be connected to a telephone system central office by means of a line 10 comprising the tip and the ring conductors T11 and R12 as shown in Figs. 1 and 2 of the drawing. The resistors RT13 and RR14 represent the total resistance of each side of the line 10 between the subscriber subset, in which the use of the present invention is intended, and the central office. A potential source 15, normally of the order of 50 volts and of the polarity shown, and pulse responsive equipment 16, which may comprise pulse detectors and registers, are shown in order to complete an operative circuit for purposes of describing this invention.

Referring now to Fig. 1 of the drawing, one illustrative embodiment of this invention is seen to be connected to the central office line 10 by means of the conductors 17 and 18. A ringer 19 and capacitor 20 bridge the conductors 17 and 18 in the telephone subset in a conventional manner and a conventional telephone handset 21 may be used to prepare the pulse generating circuit of this invention for operation by a calling subscriber. Thus the handset 21 is shown resting in a cradle 22 and may be removed therefrom to operate, by means of a pivoted bell-crank 23, the cradle-switch 24. The latter switch 24 controls a pair of normally open make contacts 25 and 26 which control the telephone line loop circuit and additional circuits in a manner to be described. An induction coil 27 comprising the windings 28, 29, and 30 together with a capacitor 31 are connected between the conductors 32 and 33 which in turn will be seen to bridge the circuit of the line conductors 17 and 18. The handset 21 is connected to the circuits of the telephone subset by means of a cord 34 including the conductors 35, 36, 37, and 38 which are connected in the subset circuitry as shown in Fig. 1. Internal connections of the handset 21 of the transmitter and receiver are to be understood as represented by the shunts 39 and 40, respectively. An off-normal switch ON41 controlling the break contacts 42, 43, 44, and the make contacts 45 is mechanically operated in conjunction with the manual operation of digital selection keys in a manner to be described.

The pulse generator specifically, of this invention, comprises the integrated combination of a means for periodically interrupting the above-described telephone line circuit, a means for counting the interruptions produced, and a means for terminating the production of interruptions after the desired number have been transmitted.

The pulse generator comprises a switching means for periodically opening and closing the telephone line loop circuit, this switching means comprising the transistors 46 and 47 connected in cascade. The emitter and collector 46*a* and 46*b* of the transistor 46 are connected, respectively, to the terminal of the tip conductor 18 and the emitter 47*a* of the transistor 47. The bases 46*c* and 47*c* of the transistors 46 and 47 are connected, respectively, through resistors 48 and 49 to the emitters 46*a* and 47*a*, with the former being connected thereto through the secondary winding 51 of a transformer 50. The transistors 46 and 47 are employed in this invention essentially as voltage responsive devices which in one state present a high impedance to the flow of current and in another state present a relatively low impedance to the flow of current.

The operation of transistor voltage responsive devices of the character used in this invention is described in detail in the above-cited copending applications. Briefly, in such devices, as the voltage across the transistor increases in value, starting at a low value, the current through it is very small. As this increase in voltage continues, a critical voltage is reached at which point the voltage falls rapidly as the current continues to increase. After passing through the region, commonly termed a negative resistance region, in which the voltage decreases as the current increases, the voltage reaches a point of substantial stability although the current may continue to increase. Obviously, the device presents a very high impedance until the critical voltage point is reached at which time it rapidly changes to its low impedance state. A resistor in the base-emitter circuit of the device, such as the resistors 48 and 49 associated with the transistors 46 and 47, respectively, control the magnitude of the critical voltage at which the device changes its impedance state. Thus if the resistor value is increased in magnitude this critical voltage will be lowered and vice versa.

Also connected to the tip conductor 18 of the telephone line loop and the emitter 46*a* of the transistor 46, is a capacitor 53 which is connected at its other terminal through a resistor 54 to the conductor 33. Shunting the resistor 54 between the capacitor 53 and the conductor 33 are a serially connected varistor 56 and a resistor 57. The capacitor 53 in series with the parallel circuit including the resistor 54 and the varistor 56 and resistor 57 combination may be bridged across the ring and the tip conductors 17 and 18 by the operation of the cradle-switch 24 and off-normal switch ON41 through a circuit which may be traced as follows: conductor 17, make contacts 25, conductor 32, conductor 55, make contacts 45, conductor 33, resistor 54 or resistor 57 and varistor 56, capacitor 53 and conductor 18. The parallel circuit including resistor 54, and varistor 56 and resistor 57 is also connected to the base 47*c* of the transistor 47 through a resistor 58 and is normally short-circuited at the break contacts 44 of the switch ON41 to which it is connected by means of the conductors 33 and 59.

The interruptions produced by the switching section of the present invention are counted and controlled by a magnetic core shift register comprising two pluralities of magnetic cores $60_1$, $60_2$ . . . $60_9$, and $60_{10}$, and $70_1$, $70_2$ . . . and $70_9$. The magnetic cores utilized in this invention are of a conventional type displaying substantially rectangular hysteresis characteristics and therefore, due to the properties displayed, will remain in either of two conditions of remanent magnetization to which driven by an applied magnetomotive force of proper polarity. Each of the cores 60 has inductively coupled thereto an advance winding 61, an input winding 62, and an output winding 63, and each of the cores 70 has inductively coupled thereto an advance winding 71, an input winding 72, and an output winding 73. The advance windings 61 are connected in series by means of a conductor 64 which conductor divides at the core $60_1$ to form two parallel branches. One of the parallel branches includes the advance winding 61 and is connected therethrough to the collector 47*b* of the transistor 47. The other branch includes the input winding 62 of the core $60_1$ and is connected therethrough to the tip conductor 18 via the conductor 65, the normally closed break contacts 43 of the switch ON41, and the conductor 66. The conductor 64, at the core $60_{10}$, is connected through the advance winding 61 to the conductor 33. The normal telephone line loop circuit of the subset shown in Fig. 1 may now be traced from the tip to the ring side of the line as follows: conductor 18, conductor 66, break contacts 43, conductor 65, input winding 62, conductor 64 and the advance windings 61 of the cores 60, conductor 33, conductor 37, the shunt 39 representing the transmitter in the handset 21, conductor 35, winding 28 of the induction coil 27, conductor 32, make contacts 25, and the conductor 17. Thus, upon the removal of the handset 21 and the attendant operation of the cradle switch 24, the contacts 25 will be closed thereby causing the line current to flow through the circuit traced immediately hereinbefore including the input winding 62 of core $60_1$ and the advance windings 61 of the remaining cores 60. The input winding 62 is wound in a sense such that the flow of line current therethrough will maintain the core $60_1$ in one condition of remanent magnetization while the windings 61 of the remaining cores $60_2$ through $60_{10}$ are wound in a sense such as to maintain the latter cores in the opposite condition of remanent magnetization.

Each of the cores 60 is coupled to an adjacent core 70 by means of a coupling circuit 67 which coupling circuit includes, for each of the pairs of cores 60 and 70, an output winding 63, an input winding 72, and a varistor 68, and each of the coupling circuits 67 is connected in a parallel arrangement to conductors 69 and 79. For reasons which will become apparent hereinafter, the output windings 63 of the last core of the shift register $60_{10}$ is connected at one of its terminals through a varistor 68 to the conductor 69, and at the other of its terminals directly to the conductor 79 without further connection to additional cores.

Bridging the conductors 69 and 79 is a capacitor 80 preceded by a varistor 68' in the conductor 69. Each of the coupling circuits 67 may accordingly be traced as follows: output winding 63, varistor 68, conductor 69, varistor 68', capacitor 80, conductor 79, and input winding 72. A delay network comprising a series-parallel connected resistor 81 and capacitor 82 also bridges the conductors 69 and 79 following the capacitor 80. The advance windings 71 of the cores 704 are conenected in series by means of a conductor 74 which conductor is connected at one of its terminals to the conductor 79 and at the other of its terminals to one side of a winding 52 of the transformer 50. Each of the cores 70 is coupled to an adjacent core 60 by means of a coupling circuit 77 which coupling circuit includes the output winding 73 of the cores 70 and the input winding 62 of the cores 60. Also included in each of the coupling circuits 77 are break contacts 78 which contacts are controlled by cams 91 affixed to each of nine manually operable keys K1, K2 . . . and K9, respectively. An additional key K0 is provided with which no contacts 78 are associated and which is therefore ineffective to control any coupling circuit 77. All of the keys K1–K0 are mechanically linked to the off-normal switch ON41 in a manner such that the operation of any one of the keys K1–K0 will cause the operation of the off-normal switch ON41. This mechanical linkage may be effectuated in any convenient manner. Thus, for example, it may be accomplished in a manner substantially similar to the arrangement utilized in my copending application cited hereinbefore in which a member 90 is longitudinally actuated by a cam 92 whenever a key is depressed to open one of the associated break contacts 78. Longitudinal operation of the member 90 causes a buffer 93 affixed thereto to operate the switch ON41 to its operated position with a resulting opening of the break contacts 42, 43, and 44, and closing of the make contacts 45.

Finally a third transistor 84 also connected as a two-impedance state voltage responsive means as described hereinbefore for the transistors 46 and 47 is connected at its emitter **84*a* to one terminal of the capacitor 82 and at its collector 84*b* through the primary winding 52 of the transformer 53 to the conductor 74. A resistor 85 connects the emitter 84*a* to the base 84*c* of the transistor 84. A capacitor 86 bridging the conductors 74 and 79 comprises, in combination with the resistance of the windings 71**, a current delay circuit, and this completes the description of the organization and structure of the illustrative embodiment of this invention as shown in Fig. 1.

When the handset 21 is removed from its cradle 22 preparatory to the placing of a call by a subscriber, the cradle-switch 24 is operated by the release of the bell-crank 23 to close the pair of associated make contacts 25 and 26. Two circuits are completed by this operation. The line loop circuit is closed from the central office along the tip conductor T11, conductor 18, conductor 66, break contacts 43, conductor 65, input winding 62 of the core $60_1$, conductor 64 and the advance windings 61 of the cores $60_2$ through $60_{10}$, conductor 33, conductor 37, the transmitter in the handset 21 represented by the shunt 39, conductor 35, winding 28 of the induction coil 27, conductor 32, make contacts 25, conductor 17, and the ring conductor R12. A local speech transmission circuit is also closed by the cradle-switch 24 as follows: one terminal of winding 29 of the induction coil 27, conductor 36', make contacts 26, conductor 37', break contacts 42, conductor 38, the receiver in the handset 21 represented by the shunt 40, conductor 36, and the other terminal of the winding 29. In this manner control of the line loop circuit and the local speech transmission circuit is transferred from the cradle-switch 24 to the off-normal switch ON41. As described hereinbefore, line current flowing from the central office battery along the circuit previously traced through the input winding 62 of the core $60_1$ in one direction and through the advance windings 61 of the remaining cores 60 in the opposite direction causes the core $60_1$ to remain in, or assume, a condition of magnetic remanence opposite to that present in the remaining cores 60. The magnetic condition of the core $60_1$ at this point, will be termed a "1" condition and the condition of the remaining cores 60 will be termed a "0" condition in accordance with magnetic core shift register terminology generally. The pulse generator circuit of this invention as shown in Fig. 1 is now prepared for the introduction therein of the first information element of the directory designation of the distant subscriber station with which a connection is to be established.

In describing the further operation of the pulse generator arrangement of Fig. 1 reference will also be made to Fig. 3*a*. It will be assumed for purposes of description that the first element of directory information to be introduced is one represented by two interruptions of the line loop circuit. Accordingly, the manually operable key K2 will be depressed thereby opening, by means of the affixed cam 91, the break contacts 78 controlling the coupling circuit 77 between the cores $70_2$ and $60_3$. The latter core is not shown in the figure but is understood to be present between the cores $70_2$ and $60_9$ as are the additional cores, also not shown, $60_4$ through $60_8$, and $70_3$ through $70_8$. Simultaneously with the opening of the break contacts 78 by the cam 91, the cam 92, also affixed to the key K2, operating in an aperture of the member 90, causes the member 90, together with its buffer 93, to move in a longitudinal direction thereby moving the switch ON41 to its operated position. The cooperation of the key K2 with the member 90 is shown explicitly in Fig. 1 by the representative key KN and its cams 91' and 92'.

The operation of the switch ON41 opens first, at its break contacts 42, the previously traced local speech transmission circuit including the receiver in the handset 21 to avoid possible annoying disturbances in the receiver due to circuit operations during pulse generation. Shortly thereafter the switch ON41 opens, at its contacts 43, the previously traced line loop circuit. Simultaneously with the opening of the contacts 43, the contacts 44 opens the speech transmission circuit which may be traced as follows from the tip side of the line T11: conductor 18, capacitor 53, conductor 59, break contacts 44, capacitor 31, all windings of the induction coil 27, conductor 32, make contacts 25, conductor 17, to the ring side of the line R12.

At its make contacts 45, the operation of the switch ON41 prepares a pulsing circuit from the tip conductor T11 to the ring conductor R12 which may be traced as follows: conductor 18, emitter and collector **46*a* and 46*b* of the transistor 46, emitter and collector 47*a* and 47*b* of the transistor 47, advance winding 61 of the core $60_1$, conductor 64 and the serially connected advance windings 61 of the cores $60_2$ through $60_{10}$, conductor 33, make contacts 45, conductor 55, conductor 32, make contacts 25 of the cradle-switch 24, and conductor 17. The closing of the make contacts 45 at the same time bridges the capacitor 53 across line circuit 10 in series with the resistor 54. At this time the varistor 56 is backbiased by the central office battery 15 and the parallel connection of the varistor 56 and the resistor 57 across the resistor 54 will have no appreciable effect upon the charging of the condenser 53**.

The instant of operation of the key K2 and the simultaneous operation of the switch ON41 is indicated as the time $t_1$ in Fig. 3*a* of the drawing. The reference line *o* represents the current value in the line loop circuit when the latter is completely open and the line *li* represents the current value in the line loop circuit when the latter is closed. The value of the central office battery voltage may conventionally be of the order of 50 volts and this value has been found advantageous for the operation of the pulse generator of the present invention. The current value *li* will then be determined by the total resistance in the line circuit. When the make contacts 45 of the switch ON41 are normal the potential drop across the capacitor 53 is zero. However, when the line loop circuit is opened at the break contacts 43 and the capacitor 53 and resistor 54 are simultaneously connected across the line 10 at the time $t_1$, the steady line current *li* is interrupted and falls to the relatively low value indicated as *f* in Fig. 3*a* of the drawing. The point *f* represents the instantaneous current in the line circuit through the resistor 54 as the full voltage of the central office battery is applied to the capacitor 53 through the resistor 54. When the capacitor 53 has attained a charge of approximately 20 volts, the line loop circuit will have attained its maximum open state, indicated as point *g* in Fig. 3*a*.

Assuming a relatively negligible resistance in the capacitor 53, resistor 58, the advance windings 61 of the cores 60, the line conductors, and the central office pulse responsive equipment 16, and a very high resistance in the transistor 47, substantially the full voltage of the central office battery 15 will appear across the base 47*c* and collector 47*b* of the transistor 47 upon the instant of the closing of the contacts 45. The transistor 46 in combination with the resistance of the winding 51 and the resistor 48 is arranged to breakdown at an applied potential advantageously determined to be approximately 20 volts. The transistor 47 in combination with the base resistance of the resistor 49 is arranged to maintain a very high resistance until an applied potential determined to be the difference between the breakdown voltage of transistor 46 and substantially the voltage of the central office battery. When the potential across the charging capacitor 53, which is connected directly to the base 46*c* of the transistor 46 through the resistor 48, rises to the value of approximately 20 volts the resistance of the transistor 46 falls sharply and the capacitor 53 begins to discharge, the discharge current flowing from the emitter 46*a* and collector 46*b* of the transistor 46, through the emitter 47*a* of the transistor 47 and resistor 49 in parallel and through the resistor 58. This flow discharge current through the emitter 47*a* reduces the impedance from the base 47*c* to the collector 47*b* of the transistor 47. The transistor 47, a negligible time after the breakdown of the transistor 46, also assumes its low resistance state. The resistor 58 is of a value relatively high in comparison with the resistance of the transistor 47 in its low resistance state and the discharge current from the capacitor 53 now flows in only a negligible amount through the resistor 58 with substantially all of this current following a path through the collector 47*b* of the transistor 47, the advance windings 61 of the cores 60 and the conductor 64, the conductor 33, the resistor 57, and the varistor 56. The latter two elements are selected by the discharge current because of the comparative values of the resistors 54 and 57 and because the current is of a polarity to permit its passage by the varistor 56. In addition to the discharge current from the capacitor 53, and because the transistors 46 and 47 now present very low resistances to the line current from the central office battery 15, a very large value of the latter current also flows through the circuit previously traced for the discharge current.

The transistor 46 has thus effectively operated to close the line loop circuit which was initially opened by the operation of the key K2 and the simultaneous opening of the break contacts 43 of the switch ON41. The operation of the transistor 46 may therefore be favorably analogized to the operation of the impulsing springs of a conventional telephone dial pulse generator. The start of the discharge of the capacitor 53 and almost instantaneous breakdown of the transistors 46 and 47 together with the resumption of the flow of line loop current occurs at the time represented as $t_2$ in Fig. 3*a* of the drawing. The interval between the times $t_1$ and $t_2$, therefore, represents the charging time of the capacitor 53 to approximately 20 volts through the resistor 54 and is determined by the values of these elements. In addition, the interval $t_1$ to $t_2$ is the interval during which the line loop circuit is effectively open to produce an initial break pulse. By a suitable selection of the values of the elements 53 and 54 (in this illustrative embodiment values of 1 microfarad and 40,000 ohms, respectively, were found advantageous) the break pulse may be determined in the order of 40 milliseconds. Such a relatively long initial break pulse preceding each train of subsequent digital pulses has been found useful for purposes of identifying the periodic interruptions of the line loop circuit which follow it as digital control pulses. Thus, for example, spurious operation of control circuits due to incidental voice frequencies may be prevented in some system applications by the interposition of enabling circuits responsive to the long break pulse. A limiting factor in establishing the duration of such a break pulse is the shortest break possible without the hazard incurred as the result of spurious signals arising from speech or room noise picked up by the telephone subset transmitter.

When the line current resumes its flow at the time $t_2$ a magnetomotive force is developed by its passage through each of the advance windings 61 of the cores 60. This magnetomotive force is in a direction, as determined by the sense of the advance windings 61, such as to drive each of the cores 60 to a magnetic condition representative of the binary value "0." Since the cores $\mathbf{60_2}$ through $\mathbf{60_{10}}$ are already in such a magnetic condition only a minor excursion of the magnetic flux in these cores takes place with only negligible resultant output voltages being induced in their associated output windings 63. Core $\mathbf{60_1}$, however, was initially in a magnetic condition representative of the binary value "1" due to the steady line current applied to its input winding 62. The core $\mathbf{60_1}$, therefore, switches from its "1" magnetic condition to its "0" magnetic condition due to the combined application of capacitor 53 discharge and line circuit current in its advance winding 61. An output voltage is thereby induced in the output winding 63 of the core $\mathbf{60_1}$ and a current accordingly flows in the coupling circuit 67 including the output winding 63 of the core $\mathbf{60_1}$, this current being of a direction to pass the varistors 68 and 68'. The capacitor 80 will now charge through the following path: conductor 79, input winding 72 of the core $\mathbf{70_1}$, coupling circuit 67, output winding 63 of the core $\mathbf{60_1}$, varistor 68, the conductor 69 and varistor 68'. At the same time the current induced in the coupling circuit 67 by the magnetic switching of the core $\mathbf{60_1}$ will develop a magnetomotive force across the input winding 72 of the core 70, in a direction such as to switch the magnetic condition of the core $\mathbf{70_1}$, to one representative of a binary value "1."

The capacitor 80 continues to charge through the previously described circuit while the induced voltage is present in the coupling circuit 67 until the breakdown voltage of the transistor 84 is reached. This point is indicated as at the time $t_3$ in Fig. 3*a*. This voltage, however, is not immediately applied across the terminals of the transistor 84 by reason of the action of the delay circuit comprising the resistor 81 and the capacitor 82, the delay duration being determined by the relative values of the latter elements. When the breakdown potential is finally applied to the transistor 84, the resistance of the latter falls sharply and begins to conduct current generated by the discharge of the capacitor 80. The varistor 68' effectively prevents the flow of this current in any other direction. The current flowing from the emitter 84a to collector 84b of the transistor 84 will pass through the primary winding 52 of the transformer 50 and the capacitor 86 will begin to charge.

The current flowing in the winding 52 will induce a voltage in the secondary winding 51 in series with the emitter 46a of the transistor 46 of a polarity to interrupt the flow of line current flowing through the latter transistor. The voltage across the transistor 46 accordingly falls below its breakdown point and the line loop circuit is again opened. The interruption of the line circuit and the beginning of the charge of capacitor 86 occurs at the time $t_4$ and represents the initiation of the first of the short digital break pulses. Obviously, the duration of the closed period of the line loop circuit represented by the time $t_2$ to $t_4$ is determined largely by the time constants of the resistor 81 and the capacitor 82. The transistor 46 has thus operated analogously to the opening of the impulsing springs in a conventional dial pulse generator. The capacitor 86 will finally fully charge and after a short delay introduced by this charging time, represented by the time $t_4$ to $t_5$ in Fig. 3*a*, the capacitor 86 will discharge through a circuit including the conductor 74 and the serially connected advance windings 71 of the cores 70, and the conductor 79. The current in the advance windings 71 will develop a magnetomotive force in a direction such as to drive the associated cores 70 to a "0" magnetic condition. At this time only the core $70_1$ is in a "1" magnetic condition and accordingly only this core will be so switched. As a result of the switching of the magnetic condition of the core $70_1$ an output voltage will be induced in the output winding 73 inductively coupled thereto and a current will flow in the coupling circuit 77 including the break contacts 78 controlled by the unoperated key K1. The latter current will develop a magnetomotive force across the input winding 62 of the core $60_2$ in a direction such as to switch the latter core to a "1" magnetic condition. Since the core $60_2$ is in a "0" magnetic condition it will switch to the "1" magnetic condition. The voltage induced in the output winding 63 of the core $60_2$ by its switching will be such as to back-bias the varistor 68 and no current will flow in the associated coupling circuit 67. The "1" magnetic condition originally present in the core $60_1$ has now been transferred to the core $60_2$. The new cycle of operation of the pulse generator of this invention begun at the opening of the line loop circuit by the transistor 46 at the time $t_4$ can now be completed.

While the current path through the transistors 46 and 47 is in a low resistance condition during the make of the first short digital pulse, that is, during the time $t_2$ to $t_4$, the capacitor 53 also discharges through this path. As previously traced, the capacitor 53 discharges through two paths whereas it charged through only one, which fact accounts for its more rapid discharge than charge. The value of the resistor 57 is low when compared with that of resistor 58 and resistor 57 therefore largely controls the discharging time of the capacitor 53. As controlled by the value of the resistor 57, the capacitor 53 will not be wholly discharged during the interval $t_2$ to $t_4$ and when it is again connected across the line 10 through the resistor 54 a lower value of line current flows in the line circuit as indicated by the point *h* in Fig. 3*a*. The time, therefore, at which the charge on the capacitor 53 again reaches the approximately 20-volt breakdown voltage of the transistor 46, the line current value at which time is indicated as point *g*, will be determined by the rate and extent to which it was permitted to discharge during the preceding interval $t_2$ to $t_4$ which in turn is controlled by the value of the resistor 57.

When the potential across the capacitor 53 again reaches the 20-volt breakdown voltage of the transistor 46 at the time $t_6$, the line current will again resume its flow through the now low-impedance transistor 46 and the instantaneously conducting transistor 47. The flow of the line current through the advance windings 61 now switches the core $60_2$ which, it will be recalled, presently contains a "1" magnetic condition. The operation of the circuit follows in precisely the same manner as was hereinbefore described for the transfer of the "1" magnetic condition from the core $60_1$ to the core $70_1$. The "1" magnetic condition is transferred from the core $60_2$ to the core $70_2$ and the capacitor 80 is again charged by the induced voltage in the coupling circuit 67 associated with the core $60_2$ and reaches the breakdown voltage of the transistor 84 at the time $t_7$. The delay circuit comprising the resistor 81 and capacitor 82 again delays the application of this breakdown voltage until the time $t_8$. At the time $t_8$ the line loop circuit is again opened when the transistor 46 cuts off and this time, therefore, marks the initiation of a second digital break pulse.

When the advance current from the discharge of the capacitor 86 is applied to the advance windings 71 via the conductor 74 at the time $t_9$, the core $70_2$ switches to return to its original "0" magnetic condition. However, it will be recalled that the contacts 78 of the coupling loop 77 associated with the core $70_2$ are open due to the operation of the key K2. Accordingly, no current is made to flow in the latter coupling circuit 77 by the switching of the core $70_2$ and the "1" condition is not further shifted along the register. The capacitor 53, at the time $t_8$, again begins to charge until, at the time $t_{10}$, it again reaches the breakdown voltage of the transistor 64 at which time line current again begins to flow thereby terminating the break of the second digital pulse.

The line current continues to flow through the low impedance path presented by the transistors 46 and 47 and through the advance windings 61 of the cores $60_1$ through $60_{10}$ via the conductor 64. This line current will again tend to switch any cores in a "1" magnetic condition to a "0" magnetic condition as previously described. However, at this time, due to the open contacts 78 of the coupling circuit 77 associated with the core $70_2$, no core 60 is in such a condition and, as a result, no current will be generated to charge the capacitor 80. The transistors 46 and 47 will accordingly not be cut-off at this time and line current will continue to flow.

In accordance with the foregoing description of the operation of one illustrative embodiment of this invention, three break pulses have been transmitted to the central office: one long and two short as controlled by the selective operation of the digital key K2. In the embodiment described, the make and the break duration of each short pulse is advantageously approximately 2 milliseconds. Obviously, however, by a suitable selection of the values of controlling circuit elements, such as the resistors 57 and 81 and capacitors 53 and 82, the length of each make and break may be controlled as desired.

Sometime later, indicated as time $t_{11}$ in Fig. 3*a*, the key K2 will be restored with a resulting simultaneous restoration of the off-normal switch ON41 and the contacts 42 through 45 will also be restored to their normal positions. As a result the speech transmission circuits are restored to talking condition, and, in addition, the capacitor 53, which has now had time to completely discharge through the circuits previously described, is removed from the line circuit and the normal line loop circuit under the supervisory control of the cradle switch 24 is restored. The latter circuit, at the break contacts 43 of the switch ON41, shunts the transistors 46 and 47 which will, as a result, cut off thereby effectively opening the circuit through the advance winding 61 of the first core $60_1$. At the contacts 43, however, the input winding 62 of the core $60_1$ has been substituted and the line current through the latter winding will restore the core $60_1$ to a "1" magnetic condition as previously described. The same current through the advance windings 61 of the remaining cores 60 will maintain these cores in a "0" magnetic condition also as previously described.

Although, for purposes of description, the operation of this invention for the transmission of only two digital control pulses was described, it is to be understood that the time required for the physical movement of a key K– from its normal to its operated position and return, that is, the time $t_1$ to $t_{11}$ indicated in Fig. 3*a*, will be adequate for the generation and transmission of any number of pulses up to a maximum of ten corresponding to the particular digit selected by the operation of the corresponding key K1 to K0. It is to be further understood that by the addition of further magnetic cores 60 and 70 and associated coupling circuits 67 and 77 and keys K–, any desired number of control pulses may be selectively generated and transmitted to suit particular system requirements. Should the additional number of control pulses generated in modifications of the illustrative embodiment of this invention described be such as to require extension of the time $t_{11}$, obvious methods of delaying the restoration of the off-normal switch ON41 may be employed. Retardation of the longitudinal restoration of the member 90, for example, would be one means of accomplishing the increasing of the time interval $t_1$ to $t_{11}$.

The operation of any one of the digital keys K– was described as opening by means of the controlled contacts 78 a coupling circuit 77 by means of which a "1" magnetic condition is transferred from a core 70 to a succeeding core 60. This, however, is not the case in the event that it is desired to generate and transmit ten digital pulses. In this case the key K0 would be depressed with the simultaneous operation of the off-normal switch ON41. However, since only the switching of a core 60 results in the generation of a current which ultimately cuts off the pulsing transistor 46, ten line interruptions will have occurred when the core $60_{10}$ has switched from a "1" to a "0" condition and no further switching is necessary or desired. Operation of the key K0 then permits the register to step through each of its stages and since no further steps are wanted, no additional core 70 is required in the register.

The pulse generator is now again prepared for the introduction therein of a second information element of the called subscriber station directory designation or, if the digit 2 resulting in the transmission of control pulses corresponding thereto as described herein was the last element of the designation, for the completion of the desired call. When the call has been completed the handset 21 will again be returned to its cradle 22 thereby restoring the cradle-switch 24. As a result the line loop circuit will be opened at the make contacts 25 thereof as will the local transmission path through the receiver at the make contacts 26.

Another illustrative pulse generator according to the principles of this invention is shown in Fig. 2 and comprises with some variation essentially the same elements as described for the embodiment of Fig. 1. In showing the embodiment of Fig. 2 the same reference characters have been used to designate identical circuit elements performing identical functions. Since generally the embodiment of Fig. 2 is organized and operates in a manner similar to that of the embodiment of Fig. 1, a description thereof will be provided in detail, only to the extent necessary to distinguish between the two embodiments.

Referring now to Fig. 2, a shunt 79' is shown to connect the conductor 79 to the conductor 33 and a transformer 50' and transistor 87 have been added. The secondary winding 51 of the transformer 50 is connected at one of its terminals through a resistor 88 to the base 87*c* of the transistor 87 and at the other terminal to the emitter 87*a*. The latter terminal remains connected to the emitter 46*a* of the transistor 46 and to the conductor 18 as was the case in the generator shown in Fig. 1. The collector 87*b* of the transistor 87 is connected through the primary winding 52' of the transformer 50' to a conductor 74' which in turn is connected to the conductor 74. The capacitor 53, in this embodiment, instead of connecting through the secondary winding 51 of the transformer 50 to the base 46*c* of the transistor 46, now connects thereto through the secondary winding 51' of the transformer 50'. Two paths are now provided for the application of line current for each phase of the operation of the shift register. One path may be traced from one side of the line from conductor 18, emitter 46*a* and collector 46*b* of the transistor 46, emitter 47*a* and collector 47*b* of the transistor 47 to the conductor 64 and the serially connected advance windings 61 of the cores 60 and to the other side of the line through the conductor 33. The other path may be traced from one side of the line from the conductor 18, emitter 87*a* and collector 87*b* of transistor 87, winding 52' of the transformer 50', conductor 74' to the conductor 74 and the serially connected advance windings 71 of the cores 70 and the conductors 79' and 33 to the other side of the line. The transistor 87 is connected in a manner essentially similar to that of the transistors 46 and 47 to provide a two-impedance voltage responsive device as previously described.

The operation of the embodiment of Fig. 2 is essentially similar to that described for the embodiment of Fig. 1 and will be described, with reference to Fig. 3*b*, only to the extent necessary to clearly present its dissimilar aspects. When the line loop circuit is opened at the break contacts 43 by the operation of one of the keys K and the simultaneous operation of the switch ON41, the current value in the line circuit falls to the value *f* as indicated in Fig. 3*b*. This occurs at the time $t_1$ at which time also the capacitor 53 begins to charge through a path which was traced previously for the embodiment of Fig. 1. When the capacitor 53 has charged to approximately 20 volts at the time $t_2$, transistor 46 and, immediately thereafter, transistor 47 begins to conduct thereby providing a path for the line current discharge of capacitor 53. The time $t_2$ therefore represents the beginning of the make portion of the first pulse to be generated. The "1" magnetic condition contained in the core $60_1$ will be transferred from the latter core $60_1$ to the core $70_1$ by the flow of line current in the advance windings 61 and a current will be induced in the coupling circuit 67 coupling the cores $60_1$ and $70_1$ as previously described. The current so induced charges the capacitor 80 until the breakdown potential of the transistor 84 is reached at the time $t_3$. The breakdown voltage is applied to bias the base 84*c* through the resistor 85, however, not until the time $t_4'$ due to the delaying action of the delay circuit comprising the resistor 81 and capacitor 82. When the transistor 84 breaks down at the time $t_4'$, the current flowing from the emitter 84*a* to collector 84*b* of the transistor 84 will pass through the primary winding 52 of the transformer 50 and the capacitor 86 will begin to charge. The current flowing in the primary winding 52 will induce a voltage in the secondary winding 51 of a value and direction to cause the breakdown of the transistor 87. Line current will accordingly now also flow, in addition to the path through the transistors 46 and 47, through the following circuit: conductor 18, emitter 87*a* and collector 87*b*, primary winding 52' of the transformer 50', conductor 74', conductor 74 and series connected advance windings 71, conductor 79, conductor 79', and conductor 33 and succeeding circuit elements to the other side of the line. The flow of line current through the winding 52' will induce a voltage in the secondary winding of a value and direction such as to cut off the transistor 46 and, an instant later, the transistor 47. The opening of the line current path at the transistor 46 may also be understood for purposes of description to occur at the time $t_4'$. The line current at this time however is uninterrupted, it now flowing through the transistor 87 and winding 52' to the conductors 74' and 74 to charge the capacitor 86.

When the capacitor 80 has been fully discharged the potential applied to the base 84c through the resistor 85 falls below the breakdown voltage of the transistor 84 and the latter cuts off. As a result the voltage developed across the secondary winding 51 of the transformer 50 also falls below that of the breakdown value of the transistor 87 which also cuts off thereby opening the line circuit and initiating the break portion of the pulse generated. The cutting off of the transistor 87 occurs at the time $t_4$ indicated in Fig. 3*b*. The line circuit is now open and will remain in this condition until the time $t_6$ when the capacitor 53 will again have charged sufficiently to cause the transistors 46 and 47 again to conduct. In the meantime, at the time $t_5$, the capacitor 86 will have been fully charged by the current flowing from the discharge of capacitor 80 and line current, as controlled by the former current in the transistor 87, and the capacitor 86 will begin to discharge through the resistances provided by the advance windings 71 of the cores 70. Core 70$_1$, it will be recalled, contained a "1" magnetic condition which condition is now transferred via the coupling circuit 77 and closed contacts 78 to the core 60$_2$. At the time $t_6$ capacitor 53 again has charged to the breakdown voltage of the transistor 46 which latter transistor and its companion 47 begin to conduct thereby restoring the line loop circuit. Line current at the value *li* again flows during the time interval $t_6$ to $t_8$: from the time $t_6$ to $t_8'$ through the transistors 46 and 47 and from the time $t_8'$ to $t_8$ through the transistor 87.

The described cycle of operation of the embodiment of Fig. 2 is repeated until the desired number of digital break pulses have been transmitted as controlled by the operation of one of the keys K1 to K0. In order to insure that the duration of the make and break portions of the digital pulses shall be the same as that for the embodiment of Fig. 1 some adjustment is obviously necessary in the time delay introduced by the delay circuit comprising the resistor 81 and capacitor 82. By adjusting the values of the latter elements the delay time represented by the interval from the time $t_3$ to $t_4$ is readily reduced to that represented by the interval from the time $t_3$ to $t_4'$ in Fig. 3*b*. The time interval $t_4'$ to $t_4$ represents the additional time required for a full cycle of circuit operation introduced by the interposition of the transistor 87 and its associated circuit elements.

The embodiment of this invention as shown in Fig. 2 of the drawing then is substantially similar to the embodiment of Fig. 1 with the addition of a means for amplifying the shift current developed in the coupling circuit 67. This is accomplished by permitting, for a short duration, the line current to flow also in the advance circuit of the second plurality of cores 70.

It is to be understood that other variations and modifications of the structure and organization of this invention in addition to those described hereinbefore may present themselves to one skilled in the art without departing from the scope thereof and that the embodiments described are merely illustrative of the possible arrangements. Thus, for example, by connecting the coupling circuit 77 associated with the core 70$_9$ directly to the input winding 62 of the core 60$_1$, a re-entrant shift register arrangement may be realized in which the "1" magnetic condition is continuously circulated in the register with a resulting continuous series of break pulses being generated if such a shift register arrangement is applied to a telephone system line loop circuit. Similarly, by connecting the coupling circuit 77 associated with the core 70$_1$ directly to the input winding 62 of the core 60$_1$, a continuously operating pulse generator may be realized, also resulting in a continuous series of break pulses being generated if applied to a telephone line loop circuit.

Other applications of the novel magnetic core shift register arrangement described as a sub-combination herein may be made in addition to those described also without departing from the scope of this invention.

What is claimed is:

1. An electrical circuit comprising a first and a second plurality of magnetic cores, an input, an output, and an advance winding inductively coupled to each of said cores, a first circuit means for serially connecting the advance windings of said first plurality of cores, a second circuit means for serially connecting the advance windings of said second plurality of cores, a first plurality of coupling circuits associated respectively with each of said first plurality of cores and connecting the output windings of said first plurality of cores and the input windings of said second plurality of cores, a second plurality of coupling circuits associated respectively with each of said second plurality of cores and connecting the output windings of said second plurality of cores and the input windings of said first plurality of cores, first switching means, a current source controlled by said first switching means for applying an advance current to said first circuit means to switch a particular core of said first plurality of cores from one to another magnetic condition and induce an output current in the associated first coupling circuit, and second switching means controlled by said output current for applying said output current to said second circuit means.

2. An electrical circuit as claimed in claim 1 in which each of said first plurality of coupling circuits is connected to said second switching means.

3. An electrical circuit as claimed in claim 2 in which the input winding of the first core of said first plurality of cores is normally connected to said current source, said input winding being in a sense to maintain said first core in said one magnetic condition.

4. An electrical circuit comprising a first and a second plurality of magnetic cores, an input, an output, and an advance winding inductively coupled to each of said cores, a first circuit means for serially connecting the advance windings of said first plurality of cores, a second circuit means for serially connecting the advance windings of said second plurality of cores, a first switching means connected to said first circuit means, a first plurality of coupling circuits associated respectively with each of said first plurality of cores and connecting the output windings of each of said first plurality of cores and the input winding of a core of said second plurality of cores, a second plurality of coupling circuits associated respectively with each of said second plurality of cores and connecting the output windings of each of said second plurality of cores and the input winding of a core of said first plurality of cores, means including a current source controlled by said first switching means for applying an advance current to said first circuit means to switch a particular one of said first plurality of cores from one to another magnetic condition and induce an output current in the associated first coupling circuit, second switching means controlled by said output current for applying said output current to said second circuit means, and means responsive to said second switching means for controlling said first switching means.

5. An electrical circuit as claimed in claim 4 also comprising means responsive to said first switching means for connecting the input winding of the first core of said first plurality of cores to said current source, said input winding being in a sense to maintain said first core in said one magnetic condition.

6. An electrical circuit comprising a first and a second plurality of magnetic cores, an input, an output, and an advance winding for each of said cores, a first circuit means including the advance windings of said first plurality of cores, a current source, a load means, and a first switching means, a second circuit means including the advance windings of said second plurality of cores and a second switching means, a first plurality of coupling circuits associated respectively with each of said first plurality of cores and connecting the output windings of said first plurality of cores and the input windings of said second plurality of cores, each of said first plurality of coupling circuits also including said second switching means, and a second plurality of coupling circuits associated respectively with said second plurality of cores connecting the output windings of said second plurality of cores and the input windings of said first plurality of cores.

7. An electrical circuit as claimed in claim 6 also comprising means responsive to said second switching means for controlling said first switching means.

8. An electrical circuit as claimed in claim 7 also comprising means responsive to said first switching means for normally connecting the input winding of the first core of said first plurality of cores to said current source to maintain said first core in a particular magnetic condition.

9. An electrical circuit comprising a first and a second plurality of magnetic cores, each of said cores having a first and a second magnetic condition, an input, an output, and an advance winding for each of said cores, a current source, load means, means for connecting said current source to said load means comprising a first switching means, and a first circuit means serially connecting the advance windings of said first plurality of cores; a second circuit means for serially connecting the advance windings of said second plurality of cores, a first plurality of coupling circuits associated respectively with said first plurality of cores and connecting the output windings of said first plurality of cores and the input windings of said second plurality of cores, a second plurality of coupling circuits associated respectively with said second plurality of cores and connecting the output windings of said second plurality of cores and the input windings of said first plurality of cores, means responsive to said first switching means for normally connecting the input winding of the first core of said first plurality of cores to said current source for normally maintaining said first core in said first magnetic condition, means for controlling said first switching means to apply a current from said current source to the advance windings of said first core and to said load means to switch said first core to said second magnetic condition and induce an output current in the associated first coupling circuit, and a second switching means connected to said second circuit means and to each of said first plurality of coupling circuits operated responsive to said output current to control said first switching means.

10. An electrical circuit as claimed in claim 9 in which each of said first plurality of coupling circuits includes a unidirectional current element and each of said second plurality of coupling circuits includes a keying means.

11. In combination, a source of potential, load means, switching means, a magnetic core being in a first of two magnetic conditions, an advance and an output winding inductively coupled to said core, means for controlling said switching means to connect said load means and said advance winding to said source of potential, said advance winding being in a sense to switch said core to a second magnetic condition and induce an output potential in said output winding, and means responsive to said output potential for controlling said switching means to disconnect said load means and said advance winding from said source of potential.

12. In an electrical circuit, a source of potential, load means, switching means, a magnetic core having two magnetic conditions, an input, an output, and an advance winding inductively coupled to said core, said input winding being normally connected to said source of potential and being in a sense to maintain said core in a first of said magnetic conditions, means for simultaneously disconnecting said input winding from said source of potential and for controlling said switching means to connect said load means and said advance winding to said source of potential, said advance winding being in a sense to switch said core to a second of said magnetic conditions and induce an output potential in said output winding, and means responsive to said output potential for controlling said switching means to disconnect said load means and said advance winding from said source of potential.

13. In an electrical circuit, the combination as claimed in claim 12 in which said switching means comprises a capacitor, circuit means for connecting said capacitor to said source of potential, said capacitor being charged when said load means is disconnected from said source of potential, and conducting means connected to said capacitor energized responsive to said capacitor being charged to a predetermined potential.

14. In an electrical circuit, the combination as claimed in claim 13 in which said conducting means comprises transistors.

15. An electrical circuit comprising a first and a second plurality of magnetic cores having two magnetic conditions, an input, an output, and an advance winding for each of said cores, a first circuit comprising the advance windings of each of said first plurality of cores, a load means, a source of potential, and a first conducting means having a first predetermined threshold; a second circuit comprising the advance windings of each of said second plurality of cores, and a second conducting means having a second predetermined threshold, a first capacitor connected to said source of potential and said first conducting means, said first capacitor being charged by said source of potential to said first predetermined threshold and discharged through said first conducting means to apply advance current to said first circuit to switch the magnetic condition of particular ones of said first prurailty of cores, a first plurality of coupling circuits for connecting respectively the output windings of said first plurality of cores and the input windings of said second plurality of cores, a second plurality of coupling circuits for connecting respectively the output windings of said second plurality of cores and the input windings of said first plurality of cores, and a second capacitor, said second capacitor being connected in each of said first plurality of coupling circuits and to said second conducting means, said second capacitor being charged by potentials induced in associated ones of said first plurality of coupling loops by the switching of said particular ones of said first plurality of cores to said second predetermined threshold and discharged through said second conducting means to apply advance current to said second circuit.

16. An electrical circuit as claimed in claim 15 also comprising means responsive to conduction in said second conducting means for bringing said first conducting means below said first predetermined threshold.

17. In a telephone subset, an impulse generator comprising a first and a second plurality of magnetic cores, an input, an output, and an advance winding inductively coupled to each of said cores, a first circuit including the advance winding of each of said first plurality of cores, a first switching means, and a source of potential; a second circuit including the advance windings of each of said second plurality of cores and a second switching means, a first plurality of coupling circuits connecting respectively the output windings of said first plurality of cores, the input windings of said second plurality of cores, and said second switching means, means responsive to said second switching means for controlling said first switching means, a second plurality of coupling circuits connecting respectively the output windings of said second plurality of cores and the input windings of said first plurality of cores, and a plurality of keying means controlling respectively said second plurality of coupling circuits.

18. In a telephone subset, an impulse generator as claimed in claim 17, also comprising control means operable simultaneously with any one of said keying means for controlling said first switching means.

19. In a telephone subset, an impulse generator as claimed in claim 18, also comprising means controlled by said control means for normally connecting the input winding of the first core of said first plurality of cores to said source of potential.

20. In a telephone subset, an impulse generator as claimed in claim 19 in which said first and said second switching means each comprises transistor means having predetermined operating potentials and a capacitor chargeable to said predetermined potential.

21. A shift register comprising a first and a second plurality of magnetic cores, an input, an output, and an advance winding inductively coupled to each of said cores, a first circuit serially connecting the advance windings of said first plurality of cores, a source of potential, a first switching means for connecting said source of potential to said first circuit, a second circuit serially connecting the advance windings of said second plurality of cores, a second switching means connected to said second circuit, a delay means, a first plurality of coupling circuits connecting respectively the output windings of said first plurality of cores and the input windings of said second plurality of cores, each of said first plurality of coupling circuits being connected through said delay means to said second switching means, a second plurality of coupling circuits connecting respectively the output windings of said second plurality of cores and the input windings of said first plurality of cores, and means responsive to said second switching means for controlling said first switching means.

22. A shift register comprising a first and a second plurality of magnetic cores, an input, an output, and an advance winding inductively coupled to each of said cores, a first circuit serially connecting the advance windings of said first plurality of cores, means connected to the input winding of the first core of said first plurality of cores for setting said first core in one magnetic condition, a first plurality of coupling circuits connecting respectively the output windings of said first plurality of cores and the input winding of said second plurality of cores, a current source, a first switching means operable to connect said current source to said first circuit to reset said magnetic condition of said first core and induce an output current in the associated output winding and coupling circuit, a first delay circuit connected to each of said first plurality of coupling circuits for delaying said output current, a second switching means connected to said first delay circuit operative responsive to said delayed output current for controlling said first switching means, a second delay circuit connected to said second switching means for again delaying said delayed output current, and a second circuit serially connecting the advance windings of said second plurality of cores and connected to said second delay circuit for applying said delayed output current to said advance windings of said second plurality of cores.

23. A shift register as claimed in claim 22, also comprising a second plurality of coupling circuits connecting respectively the output windings of said second plurality of cores and the input windings of said first plurality of cores.

24. In a magnetic core shift register a storage core and a transfer core, an input, an output, and an advance winding for each of said cores, a current source, first switching means operable to connect said current source to the advance winding of said storage core, a first delay means, a coupling circuit connecting the output winding of said storage core and the input winding of said transfer core and including said first delay means, second switching means connected to said first delay means and operable responsive to delayed current from said first delay means to control said first switching means, and a second delay means connected to the advance winding of said transfer core also responsive to delayed current from said first delay means to apply said delayed current to said advance winding of said transfer core.

25. A shift register comprising a first and a second plurality of magnetic cores, an input, an output, and an advance winding inductively coupled to each of said cores, a first circuit serially connecting the advance windings of said first plurality of cores, advance means including a current source for applying an advance current to said first circuit, a second circuit serially connecting the advance windings of said second plurality of cores, a switching means connected to said second circuit, a delay means, a first plurality of coupling circuits connecting respectively the output windings of said first plurality of cores and the input windings of said second plurality of cores, each of said first plurality of coupling circuits being connected through said delay means to said switching means, a second plurality of coupling circuits connecting respectively the output windings of said second plurality of cores and the input windings of said first plurality of cores, and means responsive to said switching means for controlling said advance means.

26. A signal generator comprising a magnetic core having an input, an output, and an advance winding inductively coupled thereto, said core being in one condition of magnetic remanence, a source of potential, first capacitance means connected to said source of potential, first conducting means operable responsive to a predetermined charge in said first capacitance means for effectively connecting said source of potential to said advance winding to switch said core to an opposite condition of magnetic remanence, second capacitance means connected to said output winding, second conducting means operable responsive to a predetermined charge in said second capacitance means, means responsive to the operation of said second conducting means for controlling said first conducting means, and means for normally connecting said input winding to said source of potential for resetting said core to said one condition of magnetic remanence.

27. In a signal generator, a first and a second magnetic core, each of said cores having an input, an output, and an advance winding inductively coupled thereto, said first core being in one condition of magnetic remanence, a source of potential, first capacitance means connected to said source of potential, first conducting means operable responsive to a predetermined charge in said first capacitance means for effectively connecting said source of potential to said advance winding of said first core to switch said first core to an opposite condition of magnetic remanence, second capacitance means, circuit means connecting the output winding of said first core and the input winding of said second core to said second capacitance means and energized responsive to the switching of said first core to switch said second core to said one condition of magnetic remanence and to charge said second capacitance means, second conducting means operable responsive to a predetermined charge in said second capacitance means, means responsive to the operation of said second conducting means for controlling said first conducting means, delay means connecting said second conducting means and the advance winding of said second core and energized responsive to the operation of said second conducting means to apply a delayed current to said last-mentioned advance winding to reswitch said second core, and circuit means connecting the output winding of said second core and the input winding of said first core and energized responsive to the reswitching of said second core to reswitch said first core to said one condition of magnetic remanence.

28. An electrical circuit comprising a first and a second plurality of magnetic cores, an input, an output, and an advance winding inductively coupled to each of said cores, a first circuit means for serially connecting the advance windings of said first plurality of cores, a second circuit means for serially connecting the advance windings of said second plurality of cores, a first plurality of coupling circuits associated respectively with each of said first plurality of cores and connecting the output windings of said first plurality of cores and the input windings of said second plurality of cores, a second plurality of coupling circuits associated respectively with each of said second plurality of cores and connecting the output windings of said second plurality of cores and the input windings of said first plurality of cores, first switching means, first means including a current source controlled by said first switching means for applying an advance current to said first circuit means, second switching means, means responsive to induced current in said first plurality of coupling circuits for operating said second switching means, means responsive to the operation of said second switching means for controlling said first switching means, and second means including a current source controlled by said second switching means for applying an advance current to said second circuit means.

29. An electrical circuit comprising a first and a second plurality of magnetic cores, an input, an output, and an advance winding inductively coupled to each of said cores, a first circuit means for serially connecting the advance windings of said first plurality of cores, a second circuit means for serially connecting the advance windings of said second plurality of cores, a first plurality of coupling circuits associated respectively with each of said first plurality of cores and connecting the output windings of said first plurality of cores and the input windings of said second plurality of cores, a second plurality of coupling circuits associated respectively with each of said second plurality of cores and connecting the output windings of said second plurality of cores and the input windings of said first plurality of cores, means for alternately applying an advance current to said first and said second circuit means comprising a first switching means for connecting a current source to said first circuit means, a second switching means for connecting a current source to said second circuit means, means for connecting said second switching means to said first plurality of coupling circuits, said second switching means operated responsive to voltages induced in said first plurality of coupling circuits, and means responsive to the operation of said second switching means for controlling said first switching means.

30. An electrical circuit comprising a first and a second plurality of magnetic cores, an input, an output, and an advance winding inductively coupled to each of said cores, a first circuit means for serially connecting the advance windings of said first plurality of cores, a second circuit means for serially connecting the advance windings of said second plurality of cores, a first switching means connected to said first circuit means, a first plurality of coupling circuits associated respectively with each of said first plurality of cores and connecting the output windings of each of said first plurality of cores and the input windings of each of said second plurality of cores, a second plurality of coupling circuits associated respectively with each of said second plurality of cores and connecting the output windings of each of said second plurality of cores the input windings of each of said first plurality of cores, means including a current source controlled by said first switching means for applying an advance current to said first circuit means to switch one of said first plurality of cores from one to another magnetic condition and induce an output current in the associated first coupling circuit, second switching means controlled by said output current for applying said output current to said second circuit means, and means including third switching means energized responsive to said second switching means for controlling said first switching means.

31. An electrical circuit as claimed in claim 30, also comprising means controlled by said third switching means for connecting said current source to said second circuit means.

32. An electrical circuit as claimed in claim 31 in which each of said first, second, and third switching means comprises transistor voltage responsive means having essentially two impedance states.

33. In a telephone subset, an impulse generator comprising a first and a second plurality of magnetic cores, an input, an output, and an advance winding inductively coupled to each of said cores, a first circuit including the advance winding of each of said first plurality of cores, a first switching means, and a source of potential; a second circuit including the advance windings of each of said second plurality of cores and a second switching means, a first plurality of coupling circuits connecting respectively the output windings of said first plurality of cores, the input windings of said second plurality of cores, and said second switching means, means including third switching means responsive to the operation of said second switching means for controlling said first switching means, means responsive to the operation of said third switching means for connecting said source of potential to said second circuit, a second plurality of coupling circuits connecting respectively the output windings of said second plurality of cores and the input windings of said first plurality of cores, and a plurality of keying means controlling respectively said second plurality of coupling circuits.

No references cited.